United States Patent
Markson et al.

(10) Patent No.: US 9,767,206 B2
(45) Date of Patent: Sep. 19, 2017

(54) SEARCHING AND AGGREGATING WEB PAGES

(71) Applicant: International Business Machines Corporation, Armonk, NY (US)

(72) Inventors: Michael Markson, San Francisco, CA (US); Krishna Srinivasan, Union City, CA (US); Nicholas Sorrentino, San Mateo, CA (US); Ann Lee Richards, Redwood City, CA (US); Rich Skrenta, San Carlos, CA (US); Gregory B. Lindahl, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/590,209

(22) Filed: Jan. 6, 2015

(65) Prior Publication Data
US 2015/0112960 A1   Apr. 23, 2015

Related U.S. Application Data

(63) Continuation of application No. PCT/US2013/049441, filed on Jul. 5, 2013.

(60) Provisional application No. 61/668,976, filed on Jul. 6, 2012, provisional application No. 61/693,222, filed on Aug. 24, 2012.

(51) Int. Cl.
*G06F 17/30* (2006.01)

(52) U.S. Cl.
CPC .... *G06F 17/30867* (2013.01); *G06F 17/3089* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 7,702,675 | B1* | 4/2010 | Khosla | G06F 17/30884 707/710 |
| 2003/0080977 | A1* | 5/2003 | Scott | G06F 17/30274 345/629 |
| 2006/0026147 | A1* | 2/2006 | Cone | G06F 17/30867 |
| 2008/0109245 | A1* | 5/2008 | Gupta | G06Q 30/02 705/1.1 |
| 2008/0244438 | A1* | 10/2008 | Peters | G06F 17/30867 715/772 |
| 2008/0288449 | A1* | 11/2008 | Kim | G06F 17/30905 |

(Continued)

FOREIGN PATENT DOCUMENTS

WO    03005240 A1    1/2003

OTHER PUBLICATIONS

"reddit.com: what's new online!". reddit website. reddit Inc., May 22, 2010. 21 Dec. 21, 2015. <https://web.archive.org/web/20100522002344/http://www.reddit.com/>.*

(Continued)

*Primary Examiner* — Aleksandr Kerzhner
*Assistant Examiner* — Eddy Cheung
(74) *Attorney, Agent, or Firm* — Zilka-Kotab, P.C.

(57) ABSTRACT

Systems and/or methods for searching and aggregating internet web page updates. The system and/or method may further allow for customization of topics to update. Additionally, social media aspects of the system and/or method may allow for voting and commenting as well as sharing.

16 Claims, 8 Drawing Sheets

HOME PAGE

(56) References Cited

U.S. PATENT DOCUMENTS

| | | | |
|---|---|---|---|
| 2009/0271247 A1* | 10/2009 | Karelin | G06Q 10/10 |
| | | | 705/319 |
| 2010/0083124 A1* | 4/2010 | Druzgalski | G06F 17/3087 |
| | | | 715/738 |
| 2011/0078130 A1 | 3/2011 | Roizen et al. | |
| 2011/0213805 A1 | 9/2011 | Walther et al. | |
| 2011/0264509 A1 | 10/2011 | McElfresh et al. | |
| 2011/0289143 A1 | 11/2011 | Polis et al. | |
| 2012/0150844 A1 | 6/2012 | Lindahl et al. | |
| 2012/0158632 A1 | 6/2012 | Grenier et al. | |
| 2012/0291079 A1* | 11/2012 | Gordon | H04N 21/2665 |
| | | | 725/109 |
| 2013/0067312 A1* | 3/2013 | Rose | G06Q 30/0269 |
| | | | 715/234 |

OTHER PUBLICATIONS

"reddit.com: what's new online!". reddit website. reddit Inc., May 22, 2010. Jun. 30, 2016. <https://web.archive.org/web/20100522002344/http://www.reddit.com/>.*

International Search Report and Written Opinion from PCT Application No. PCT/US2013/049441, dated Jan. 16, 2014.

* cited by examiner

HOME PAGE

NEWS BOARD

SUBMIT AN ARTICLE

FIG. 3

VOTE / COMMENT ON AN ARTICLE

FIG. 4

NAVIGATION

FIG. 5

USER BOARD

FIG. 7

EXAMPLE OF CREATING A NEW BOARD

FIG. 8

SEARCHING AND AGGREGATING WEB PAGES

CROSS-REFERENCE TO RELATED APPLICATIONS

This patent application claims priority from and is related to International application no. PCT/US13/49441 filed 5 Jul. 2013, which claims priority from U.S. provisional applications 61/668,976 filed 6 Jul. 2012 and 61/693,222 filed 24 Aug. 2012, which are hereby incorporated by reference in their entirety.

TECHNICAL FIELD

This application relates to the field of digital computing or data processing, which includes internet web pages, internet searching, search databases, and web page update aggregation.

BACKGROUND

Internet web pages are constantly updated with new news articles, new information, and new products for review by customers and users. Users now demand to view these constant updates and be kept abreast of the latest information. Various attempts have been made at aggregating news web pages. Further RDF Site Summary (RSS) feeds allow for updates to users in a blog type environment.

SUMMARY

The systems and methods described here include a method and system of aggregating internet web pages comprising, at a server in communication with a database and a network, receiving a link to an internet webpage, categorizing the linked webpage based on the webpage content, in a category webpage, causing display of a summary of the linked webpage with summaries of other linked webpages in the same category, allowing users to comment on the linked webpage, allowing users to vote on the linked webpage, wherein the vote is included in a rating of the linked webpage, and causing display in the category webpage of at least one of the comments and the votes, in the summary of the linked webpage.

Some embodiments include methods and systems where the summary includes at least one of, from the linked webpage, representative portions of text and representative photos. Certain embodiments include methods and/or systems further comprising, at the server, causing display of a home webpage, wherein the home webpage includes a link to the category web page in a menu of category webpages. Some methods include, at the server, allowing a user to log into the home page.

Some example methods and systems include the login via a third party webpage. Some methods and systems include at the server, updating the third party webpage with at least one of the logged in user comment and vote. Certain embodiments include, wherein the receiving of the webpage link is from a user over the network. Some embodiments include, at the server, awarding a user point to the logged-in user, based on at least one of, the user comment, the user vote, user visits to a webpage, votes received for submitted links, comments received for submitted links, category creation, and social media links.

The disclosures here include methods including at the server, causing display of advertising on the category page, based on at least one of, the category, a browsing history, a search query, and a server selected advertisement. And some embodiments include the receiving of the webpage link from a search engine in communication with the server.

Certain embodiments disclosed here include at the search engine, searching the network for webpage content based on a category, and sending a link to the searched webpage to the server for display of a summary of the searched web page in a category page matching the category. Some embodiments include where the content includes text and photos.

Some embodiments include, at the server, allowing a user over the network to navigate among at least two category pages via a menu of categories. Some embodiments may include examples where the home page includes display of tiles, the tiles including the categories. Some methods and systems include wherein the tiles are ordered according to, at least one of, rating, server defined order, user defined order, and time of category update.

There are embodiments contemplated here that include methods and systems wherein the rating includes the user votes. Further, embodiments may include wherein the category webpage is a news board including display of at least one of, a title, a topic of the category, a menu of other news boards, update information, and a button to order the display of the summaries. Some example embodiments may have the summary that includes an identifier of the user who submitted the link. In certain embodiments the summary is taken from at least one of, a Rich Site Summary (RSS) feed of the linked webpage and text in the linked webpage.

In come embodiments disclosed here, the third party webpage is a social media webpage. In some embodiments, the button is configured to allow a user to order the summaries by at least rating and recent update. In some embodiments, at the server, de-duplicating links to web pages if more than one of the same links to a web page is received for a category. Some embodiments have the update information that includes at least one of the number of links updated during a given time.

Some embodiments here include wherein a link is a Uniform Resource Locator (URL) to a webpage. Certain embodiments have the representative photo is from at least one of, the linked webpage and a user selected photo. Certain example embodiments have the, allowing the users to vote, is via the social media website. In some embodiments, the allowing the users to comment is via the social media website.

Certain embodiments include at the server, causing display of a user board, wherein the user board includes at least one of user selected summaries and categories. Some embodiments include at the server, causing display of a user board, wherein the user board includes at least one of, user selected summaries, categories, and a display of social media friends. Some embodiments include wherein the user board is at least one of publically available and privately available limited only to the user's friends. Some embodiments here may have at the server, causing display of a search box in the category page, allowing the user to send a search query to the search engine via the search box, and causing display of the search results, based on the search query. And some examples include wherein the search query includes slashtags.

Some example embodiments here include a method and/or system of aggregating internet web pages comprising, at a search engine, in communication with a server, a database and a network, searching the network for webpage content based on a category, locating at least one webpage based on the category, sending a link to the located webpage, to the server, at the server, analyzing the sent link to the internet webpage, categorizing the linked webpage based on the webpage content, causing display of a summary of the linked webpage content with summaries of other linked webpages in the same category.

Some embodiments include, at the server, allowing users to comment on the linked webpage, and allowing users to vote on the linked webpage. And some embodiments have wherein the summary is derived from at least one of, a Rich Site Summary (RSS) feed of the linked webpage and text in the linked webpage.

Certain example embodiments include via the server, allowing a user to log into a homepage, the homepage configured to link users to category pages, wherein the category pages include webpages with links and summaries of webpages of the same category. And some have wherein the, allowing the users to vote, is via a social media website. Some example embodiments include wherein the allowing the users to comment is via a social media website. Certain embodiments have wherein the log into is via a social media webpage. Examples may also include, at the server, causing display of a user board, wherein the user board includes at least one of user selected summaries and categories.

Certain embodiments here include a system and/or method for aggregating internet web pages comprising, a server in communication with a database and a network, the server configured to, receive a link to an internet webpage, categorize the linked webpage based on the webpage content, cause display of a summary of the linked webpage with summaries of other linked webpages in the same category in a category webpage, allow users to comment on the linked webpage, allow users to vote on the linked webpage, wherein the vote is included in a rating of the linked webpage, and cause display in the category webpage of at least one of the comments and the votes, in the summary of the linked webpage.

Certain embodiments of the methods and systems here may include wherein the summary includes at least one of, from the linked webpage, representative portions of text and representative photos. Some embodiments include wherein the server is further configured to, cause display of a home webpage, wherein the home webpage includes a link to the category web page in a menu of category webpages. And some embodiments include wherein the server is further configured to, allow a user to log into the home page. Some embodiments disclosed here include wherein the login is via a third party webpage.

Some embodiments include wherein the server is further configured to, update the third party webpage with at least one of the logged in user comment and vote. And some include wherein the received internet webpage link is from a user over the network. Some embodiments include wherein the server is further configured to, award a user point to the logged-in user, based on at least one of, the user comment, the user vote, user visits to a webpage, votes received for submitted links, comments received for submitted links, category creation, and social media links.

Some embodiments here include wherein the server is further configured to, cause display of advertising on the category page, based on at least one of, the category, a browsing history, a search query, and a server selected advertisement. Some embodiments include wherein the received internet webpage link is from a search engine in communication with the server. And some include wherein the search engine is further configured to, search the network for webpage content based on a category, and send a link to the searched webpage to the server for display of a summary of the searched web page in a category page matching the category.

Some embodiments include wherein the content includes text and photos. And some have wherein the server is further configured to, allow a user over the network to navigate among at least two category pages via a menu of categories. Certain embodiments may have wherein the home page includes display of tiles, the tiles including the categories. Certain embodiments may have wherein the tiles are ordered according to, at least one of, rating, server defined order, user defined order, and time of category update. Some example embodiments may include wherein the rating includes the user votes. And some may include wherein the category webpage is a news board including display of at least one of, a title, a topic of the category, a menu of other news boards, update information, and a button to order the display of the summaries.

Certain embodiment here may have wherein the summary includes an identifier of the user who submitted the link. And some may include wherein the summary is taken from at least one of, a Rich Site Summary (RSS) feed of the linked webpage and text in the linked webpage. Some embodiments may have wherein the third party webpage is a social media webpage. And some may include wherein the button is configured to allow a user to order the summaries by at least rating and recent update.

Some embodiments may have wherein the server is further configured to, de-duplicate links to web pages if more than one of the same links to a web page is received for a category. And some may have wherein the update information includes at least one of the number of links updated during a given time. Certain embodiments may have wherein a link is a Uniform Resource Locator (URL) to a webpage. And some may include wherein the representative photo is from at least one of, the linked webpage and a user selected photo.

Certain embodiments may include wherein the, allow the users to vote, is via the social media website. And some may include wherein the allow the users to comment, is via the social media website. Certain embodiments may have the server further configured to cause display of a user board, wherein the user board includes at least one of user selected summaries and categories. Some may include the server further configured to, cause display of a user board, wherein the user board includes at least one of, user selected summaries, categories, and a display of social media friends. And some may include wherein the user board is at least one of publically available and privately available limited only to the user's friends.

In certain embodiments, the system and/or method may include the server further configured to, cause display of a search box in the category page, allow the user to send a search query to the search engine via the search box, and cause display of the search results, based on the search query. Some embodiments may have the search query include slashtags.

In some embodiments, a system for aggregating internet web pages may comprise a search engine, in communication with a server, a database and a network, the search engine configured to, search the network for webpage content based on a category using a slashtag query, locate at least one webpage based on the category, send a link to the located webpage, to the server, at the server, analyze the sent link to the internet webpage, categorize the linked webpage based on the webpage content, cause display of a summary of the linked webpage content with summaries of other linked webpages in the same category.

Certain embodiments may include the server further configured to, allow users to comment on the linked webpage, and allow users to vote on the linked webpage. Some embodiments may include the summary derived from at least one of, a Rich Site Summary (RSS) feed of the linked webpage and text in the linked webpage. And some may include the server further configured to, allow a user to log into a homepage, the homepage configured to link users to category pages, wherein the category pages include webpages with links and summaries of webpages of the same category.

Some embodiments may have the, allow the users to vote, via a social media website. And some may have the allow the users to comment via a social media website. Some embodiments may have the log into via a social media webpage. And some may include the server further configured to, cause display of a user board, wherein the user board includes at least one of user selected summaries and categories.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIG. 3 is a drawing of an example screenshot of an example Article Submission page consistent with certain aspects related to the innovations herein.

FIG. 4 is a drawing of an example screenshot of Vote/Comment on an Article consistent with certain aspects related to the innovations herein.

FIG. 5 is a drawing of an example screenshot of an example user Navigation consistent with certain aspects related to the innovations herein.

FIG. 7 is a drawing of an example screenshot of an example Search page consistent with certain aspects related to the innovations herein.

FIG. 8 is an example screenshot depicting an example of creation of a new board consistent with certain aspects related to the innovations herein.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the inventions to these particular embodiments. In other instances, well-known data structures, timing protocols, software operations, procedures, and components have not been described in detail so as not to unnecessarily obscure aspects of the embodiments here.

In summary, this disclosure relates to internet web page aggregation that allows for updates to be displayed. The displays can include representative Snippets of the articles and even representative photos. The aggregation can be done in an automated fashion, using search algorithms and popularity algorithms. Further, this application relates to the ability for users to customize the updated information. Users may also vote or comment on articles. This allows for social media share opportunities of the articles.

Home Page

Figure 1:
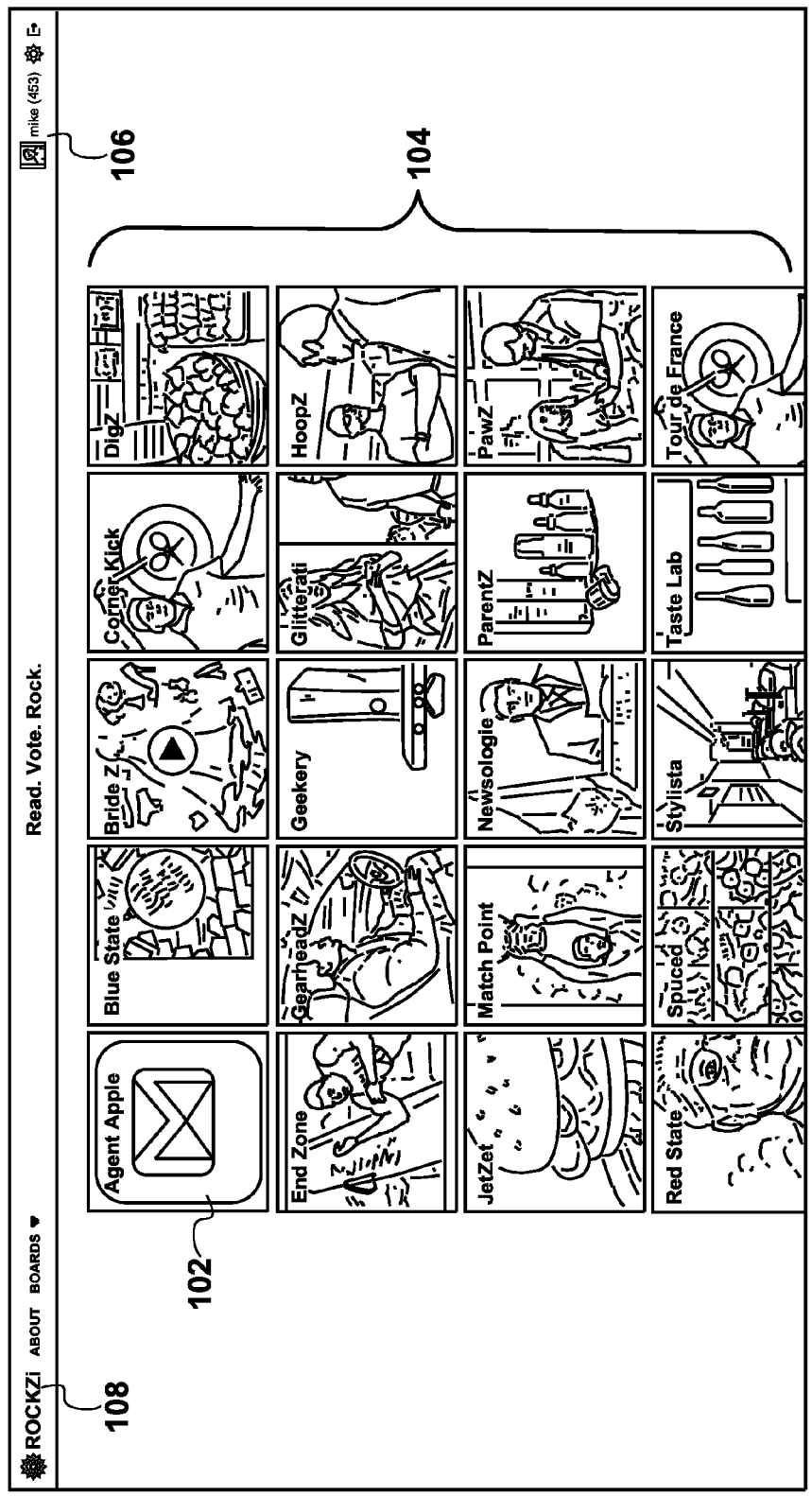
FIG. 1 is a drawing of an example screenshot depicting an example Home Page consistent with certain aspects related to the innovations herein.

FIG. 1 shows a screenshot example of a Home Page embodiment. The Home Page may be the initial screen that the system causes to be display to a user starting to use the system. The Home Page displays for users of the system, a tiled arrangement of images and associated titles. These images and titles relate to various topics of which an underlying News Board compiles links to articles and web pages that relate to the particular topic.

After browsing the tiles, a user can then click through one to access the underlying News Board. For example, in FIG. 1, one of the Boards is entitled "Agent Apple," 102. This board, when clicked by a user, takes the user to the specific "Agent Apple" News Board, as shown as an example in FIG. 2. The example tile "Agent Apple" deals with the topic of specific technology and technology news. Various other topics have titles that also allude to their content as shown in the example grid of summary tiles 104. Some other examples shown in more detail in FIG. 2 include "End Zone" for American football related information, "Stylista" for style and fashion content, and "GearheadZ" for automotive information. Any topic could be used for these purposes and associated News Boards could be created to deal with any topic.

The decision of which representative News Board tiles to show on the Home Page could be based on a number of things. For instance, as an example, the most popular Boards, as described below, may show up toward the top of the page. Alternatively, Home Pages could be customizable. Users could customize their own Home Page after they sign in, as discussed later in this disclosure, to ensure particular subjects or Boards show up toward the top of that Home Page. Further, an editor of the system could decide which tiles to place toward the top of the Home Page. Any number of these or other options could be used for this purpose.

The home page also shows the logged in user, in this case "Mike" 106. The system allows users to log into the system in order to customize the pages, to coordinate with third party websites such as social media sites, and also for identifying for the user many features described in more detail below.

The example home page screenshot also shows a title bar 108, which allows users to navigate the system and learn more about the system. These example embodiments are described in more detail below.

News Board/Category Page

Figure 2:
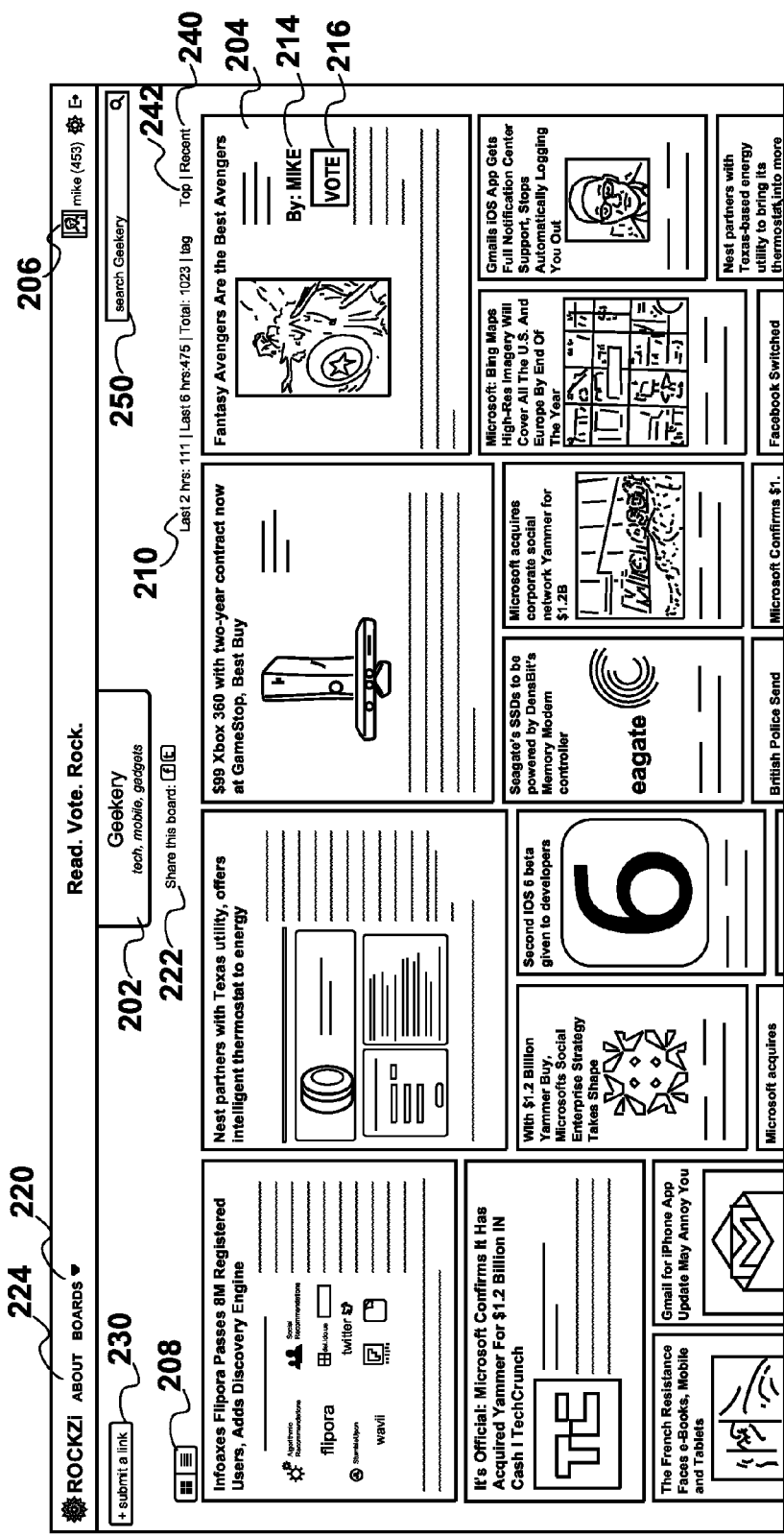
FIG. 2 is a drawing of an example screenshot of an example News Board consistent with certain aspects related to the innovations herein.

FIG. 2 is a screenshot example of a News Board webpage of one example embodiment here. For instance, in this example, if a user clicked the "Geekery" summary board from their home page, they would be taken to this page, the actual News Board for this topic. The title of this News Board is displayed at the top, here "Geekery" is that title 202 which indicates that the Board's topic is technology and technology news. Every tiled link on the page would relate in some way to this topic, as the category of this particular board. In this way, users can go to fewer pages to more read news and updates about topics and/or categories that they are interested in.

The content of the articles or links is populated by the system in many ways including through a search engine such as blekko. In one example embodiment, the articles or links are pulled from [search terms/date] e.g. [lindsay lohan/date]. In another embodiment, the articles or links are pulled from [/slashtag/date] e.g. [/gossip/date] may be used. In a third embodiment, [search terms/slashtag/date] e.g. [lindsay lohan/gossip/date] may be used.

In certain embodiments, the content of the articles or links is populated RSS feeds. These RSS feeds may be used in their totality, or articles within the RSS feeds might be selected using keywords. For example, the system might populate the "Paris Hilton" board by taking the RSS feed from the website celebuzz.com, and only selecting articles where the words "Paris Hilton" occur in some combination of the title of the article, the body of the article, or the initial section of the article.

In some embodiments, the content of the articles or links is populated using some combination of search engine feeds and/or RSS feeds.

The display of each tiled link can show multiple features on it. For instance, a "Snippet" of the article itself can be shown in a summary tile 204. This short summary may allow the user to read a short amount of the story or topic, in order to allow the user to best decide which links to click through. In some example embodiments, images can be displayed in the summary tile, related to the topic of the link, or shown on the linked page, to aid the user's selection. This link/summary tile can also include an image and the information on the address of the link, here, "webpronews.com," (not pictured). Additionally, the user who submitted the link or article may be identified. In certain embodiment examples a line such as, "By . . . " may show the user who submitted an article or link. FIG. 2 shows "By Mike" 214, indicating a user named Mike submitted this article. If the system submitted it, it may be indicated so by showing "By ROCKZi," for example. A vote may also be cast using any number of ways, here shown by a "vote" button 216. Such a button may allow a user, maybe only a logged in user, to indicate their affinity for an article, described in more detail below.

Snippets and/or summaries may be taken from RSS feeds or from the underlying web page itself. Testing may occur to check for hostnames or known bad text. The system may eliminate bolding of text, removal of host names and bad text as desired. For example, a Snippet would normally remove "Login with Twitter" from a linked page because this information does not help a user decide whether to click through to view the full link or not. It is merely useful on the underlying page. The system can identify such phrases and keep them from inclusion on the Snippet.

The Top of the News Board shows multiple exemplary buttons for a user to implement. Once such exemplary button is "Top" which is next to "Recent," 240. This feature may allow users to toggle between which links have been rated as the "top" links, as determined by the system using some calculation such as number of votes, (as described below) or some other popularity metric, and which links have been updated most recently.

The "Recent" feature 240 relates to the display of tiled links that have been updated most recently. If selected, the system will update the News Board as the underlying linked pages are updated. The older articles will move down the News Board as they are time decayed and the newer articles will populate the top of the News Board. In some embodiments, the blekko slashtag/date may be used to sort the most recent articles for display.

The "Top" feature 242 relates to voting, discussed later in this disclosure. By voting on links, other users can affect the display of those links on a particular News Board. Thus, by obtaining more votes, a link would move up the News Board toward the top, and gain exposure to yet more views. In this way, less popular links, gathering less votes, would move down the News Board and farther out of sight.

In some embodiments, the Top feature 242 may also be construed from a combination of recentness, or time based, and time decayed votes. In yet other embodiments, a Top ranking algorithm could give extra weight for search engine host ranks.

In certain embodiments, the News Board may even utilize a scroll bar (not pictured) to allow for many links to show up on one News Board, and by scrolling down from the top of the Board, a user can see links that were updated later than those towards the top.

Alternatively, instead of the tiled display, as shown in the example News Board of FIG. 2, the links could be arranged in a list view. This example shows on the top left of the tiles two options for display, a tile arrangement and a listing arrangement 208. Other features or layouts could be added to this list or taken away as desired.

Additionally, or alternatively, the system could be used to diversify the News Board. This could be accomplished by posting the top articles from different hosts. In this way, a good diverse mix of topics could be maintained.

Links and articles could be "de-duplicated" in order to ensure that similar information is not being repeated on a page. Also, the system could cluster articles. For example, the system could de-duplicate the Associated Press wire feed or other shared articles.

The News Board may also feature, as shown in the example of FIG. 2, the information pertaining to the update information for the tiled links. Here, for example, this News Board shows 210 that within the last two hours, "111" links were updated and "475" in the last six hours.

This exemplary News Board of FIG. 2 also shows a "submit a link" button 230 which will be discussed later in this disclosure.

This exemplary News Board of FIG. 2 also shows a search box 250 near the top. This search box 250 may be used to search this particular News Board or various News Boards on the system. This embodiment could be located anywhere on the screen or in a popup window but is shown here as an example. This and other example embodiments will be discussed in more detail later in this disclosure.

This exemplary News Board of FIG. 2 also shows user login information near the top. Here, "Mike" is the exemplary user 206. Signing in relates to voting and commenting, a topic discussed later in this disclosure.

Other features on the exemplary News Board in FIG. 2 include information "About" the system 224. This feature could display information about the system, owner of the system, editor of the system or manager of the system. Also shown is a drop down menu 220 for selecting different "Boards." This navigation of the system is also detailed below.

Social Media

This exemplary News Board of FIG. 2 also shows a "share" button at the top 222. In this example, this "share" button shows a Facebook and Twitter logo but could show any number or type of social media logo, indicating a connection with a particular social media site. These buttons allow users to access their established social networking sites to "share" their votes and comments with those networks. In this way, the user can inform his or her followers of his or her latest activities.

This social networking aspect could encompass any number of social networking sites, run by third parties or some proprietary network. These could be in both mobile networks and conventional internet networks. Social networking sites are those that allow users to connect with other users and share information and/or connect with them. This can be in a "following" or "friend" type of arrangement where users subscribe to certain users' feeds of updates and information. When those users update information, it may be pushed to the followers or friends in order for them to become informed of the latest activities of the active user.

Social networking may allow for exponential exposure on a grass roots level of the internet. Instead of blasting a link to everyone, these "sharing" features may push links to only those users who have indicated that they want to receive updates and links from a certain user. Thus, they are more likely to pay attention and click through or read the links, because they are coming from a user whom they have pre-selected and/or approved.

Some embodiments may include other third party networking sites such as LinkedIn or Flipboard. Through these sites, just as in Facebook or Twitter, users can tap into particular social media networks, share information, and share updates from this system.

Some example embodiments may include updating information from web sites that are not necessarily news related. Although the Boards may be called News Boards, the information contained on the underlying links or articles could be any number of things, and the "news" is just the news of the updates to those pages. For instance, updates to shopping websites could be used to populate a Board. If "shoes" is the Board topic, the system may search for all shopping websites that update for shoes, or show websites promoting lower prices or sales for shoes. In this way, users could simultaneously search for items on many multiple websites and find the latest and best deals. Another example may be travel updates for deals or sales. A Board called "Caribbean Travel" may update not only bogs and news articles on the Caribbean but also travel agencies, car rentals and airline and cruise tickets to the Caribbean.

Further examples include Boards that update from web pages regarding hospital or health related entities, governmental regulatory topics, legal or statutory updates and changes.

Article or Link Submission

Figure 3:
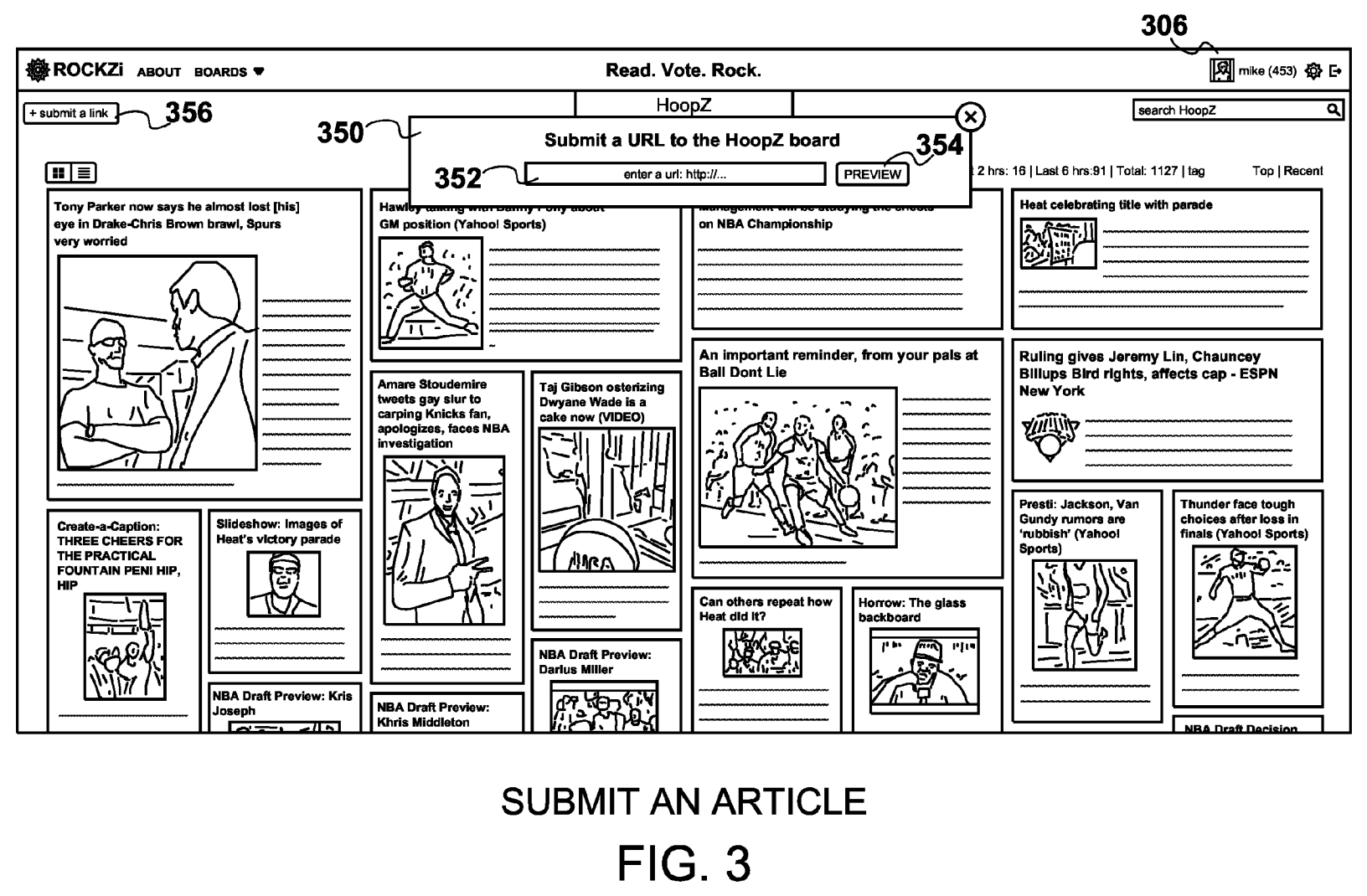

FIG. 3 is a screenshot example of a webpage allowing a user to Submit an Article in one embodiment. This is shown in an example pop up window 350, but could be displayed in any number of example positions on a screen. The example here shows a text box 352 that may allow users to enter the text string of the webpage URL (uniform resource locator). The example embodiment shown also includes a "preview" button 354 which may allow the user to preview the linked page. Users may access such example embodiment options by clicking on a "submit a link" button 356 on the category page/ News Board.

As mentioned above, when a user is logged on, they may be allowed to submit an article to a particular News Board or category page. These submitted articles or links may augment the system's population of links or articles or replace them altogether if enough submissions are received.

Here, any user can read News Boards and links, but only users who have registered and logged in to the system may submit an article or link or, as will be described later, to vote or comment on an article or link. It is through this login process, that the identity icon is shown on the web page, here as an example, "Mike" with a submitted picture in the top corner 306.

Logging on to a system such as this may allow certain embodiments to be included, over systems that do not require a login. Logging in requires a user to register their credentials with the system before being allowed certain privileges within the system. There may be a verification step involved with this registration, which may requires users to submit an email address, for instance, and then reply to or click through a special link that is sent to that email address. This registration and verification process is usually successful at removing the bulk spam type of users. These bulk spam users can degrade a system which allows for user input to be displayed by pushing advertisements or links to nefarious web pages. Unchecked users are also harder to police, as will be discussed in the comments section later.

A login could be through a third party website such as a social network including Facebook or Twitter, for example. In this way, this system, according to some embodiments, could utilize the verification of identity that these other social media sites use and avoid having to coordinate the verification process itself. Also, using an existing social media site login may allow for linking to the social media feeds of each user. Yet another characteristic to using an existing social media login may be that users are less likely to post inappropriate or spam messages in this system, because the activities will be echoed in their own social media feeds and websites. Peer pressure can be a motivator for users to keep their posts and links appropriate.

Once logged in, a user may be allowed to submit a URL to a particular News Board. This is accomplished through the "Submit a Link" button 356 as discussed above, or could be accomplished through any number of exemplary data entry boxes or fields.

Another way a user could submit a link is through the browser "bookmarklet" (not pictured) which is available on the site to be linked. Such an example bookmarklet may be, for example, a webpage bookmark stored in a web browser that contains JavaScript commands to extend the browser's functionality. For example, a bookmarklet may allow a user to select text on a page, click the bookmarklet, and be presented with a search engine results page for the search term selected.

Once identified, the system can use the http address information of the link to create the tile Snippet and/or summary and representative image, if used. The system may do this by using any number of information sources including, but not limited to, an RSS feed summary, provided by the linked web page itself, or by using algorithms to pull together a summary for the article or update. Human editor intervention can also be used to create Snippets and/or summaries. Systems such as a search engine crawler could be used to gather RSS feeds.

In some embodiments, the image may be pulled from the linked site and may be resized in order to accommodate the News Board. In this way, a later user may then be presented with a short summary, but in image form and prose, of the linked information. In yet other embodiments, a user who submitted an article or link may choose the image to display with the Snippet and/or summary, if more than one image is available.

The image used in the article or link tile or list may require a minimum size to display. It may have certain aspect ratio limits. The system may, in some embodiments, keep track of images to avoid repeating images on a Board or Home Page.

The system can then do any number of things with this particular submitted link. It can decide whether to use it in other Boards that may pertain to the underlying topic. It may cache it for review purposes, in order to weed out inappropriate links or spam or advertising. Anti-spam routines can also be run on a submitted link. A test to ensure that the linked URL is to an actual story or legitimate web page instead of to a spam or fraudulent web page or illicit topics such as pornography. It may also decide how and when to post the link, based on the status of the submitting user. For instance, an authorized user may have authority to post links to a particular board, without any oversight. Other, for instance, new users, may have to be vetted before their links post. In this way, the integrity of the Boards may be upheld with minimal oversight while allowing for updates to be posted as soon as possible.

Voting and Commenting

Figure 4:
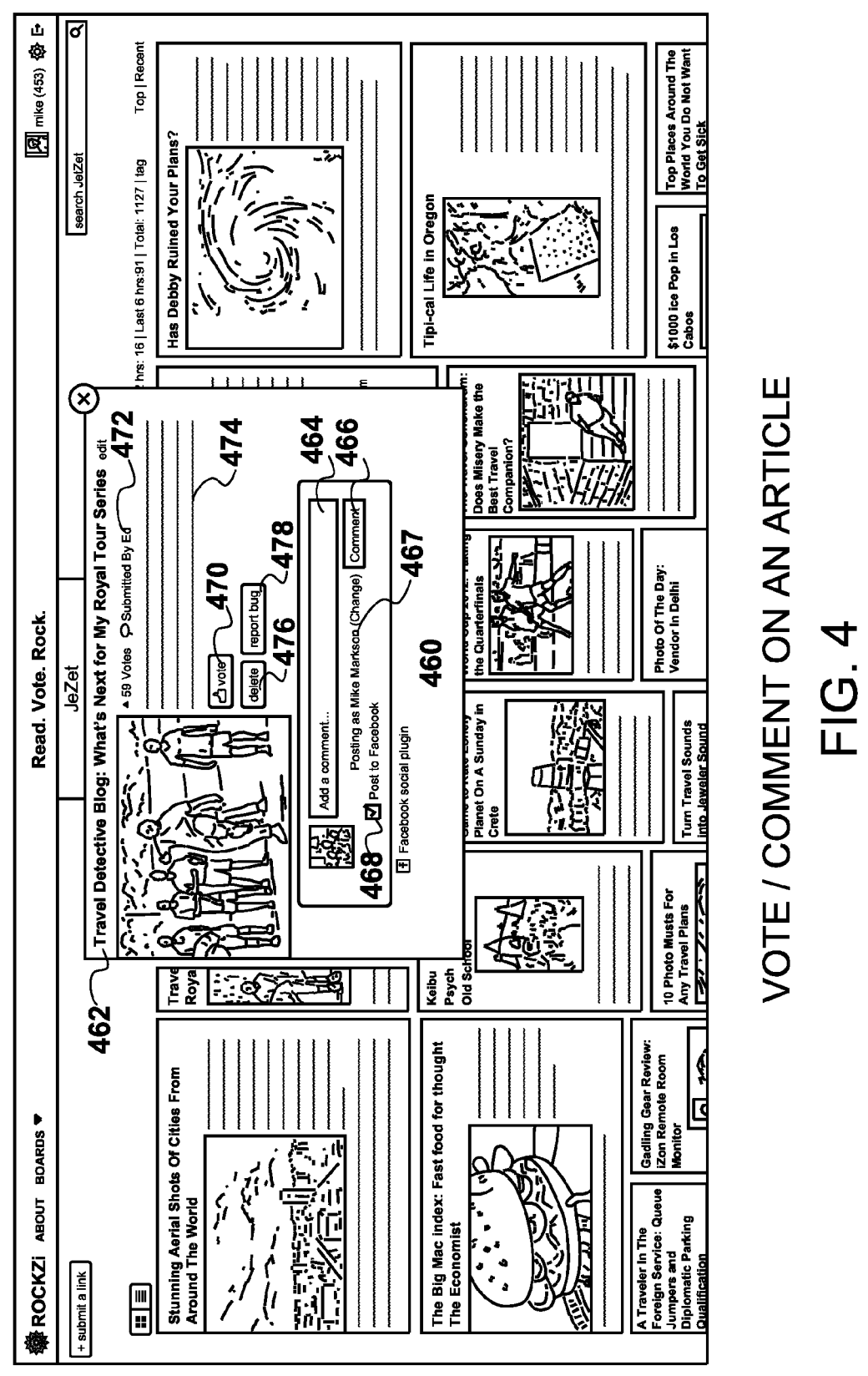

FIG. 4 is a screenshot example of an embodiment including a page allowing a user to Vote and/or Comment on an Article. As discussed above, for example, the system may be configured to allow only users who log in are allowed to vote and/or comment on an article or link.

A Vote could be accomplished by clicking on a button on the link tile. This button could read "Vote," "Rock It," or any other kind of phrase. It could also show an icon that users know means a vote. In this way, users can reveal their appreciation or affinity for a particular link or story. This vote is then passed through the users' social network, if such a network is used to sign in. Negative or neutral votes could also be used alone or in conjunction with a positive vote as described above.

A Vote could also be done entirely within the social network confines. For instance, a "like" button in Facebook could be used to vote for a story or link in this system. In that way, integration into the social network is assured.

Boards may or may not include voting capabilities. Editors may wish to display links or articles based on other criteria and not want to allow voting on a Board.

After clicking on the button, the system may cause display of a popup window 460 for example. Such a window may include any number of things associated with voting and submitting comments including, in this example embodiment, a title of the article 462, the user's identification information, who submitted the article 472, a short text summary of the article 474, a text box where the user may enter text comments 464, a comment button 466 for submitting the comment, a logged in user identifier 467, indicating the name of the logged in user under which the submitted comment will be posted, a button 468 allowing the user to select a third party webpage to send the information through, in this case, a link to the logged in user's Facebook account.

A Comment may be a way for a user to make a short notation about a particular link or story. Again, logged in users may link their social media accounts to echo their comments onto their social media feeds and posts. In this way, a user may simultaneously comment on a story for the benefit of other users of this system, but also for the benefit of their social media followers and friends as well.

In another embodiment, a user could elect to "Post" a link to their associated social media site, such as through the button 468 described above. A user may also merely post the link or story on a social media site without having to comment or vote at all.

A vote may be a way for logged in users to indicate their affinity for a particular article, or their wish to see that article rise in the popularity rankings Such a vote may be accomplished through a button such as the example vote button 470 shown here.

Other features of this kind could be utilized as well. FIG. 4 shows a "delete" 476 and "report bug" button 478 on the Vote/Comment page. These buttons, or any other kind of buttons could link functionality from this system to the user's social media account.

Navigating

Figure 5:
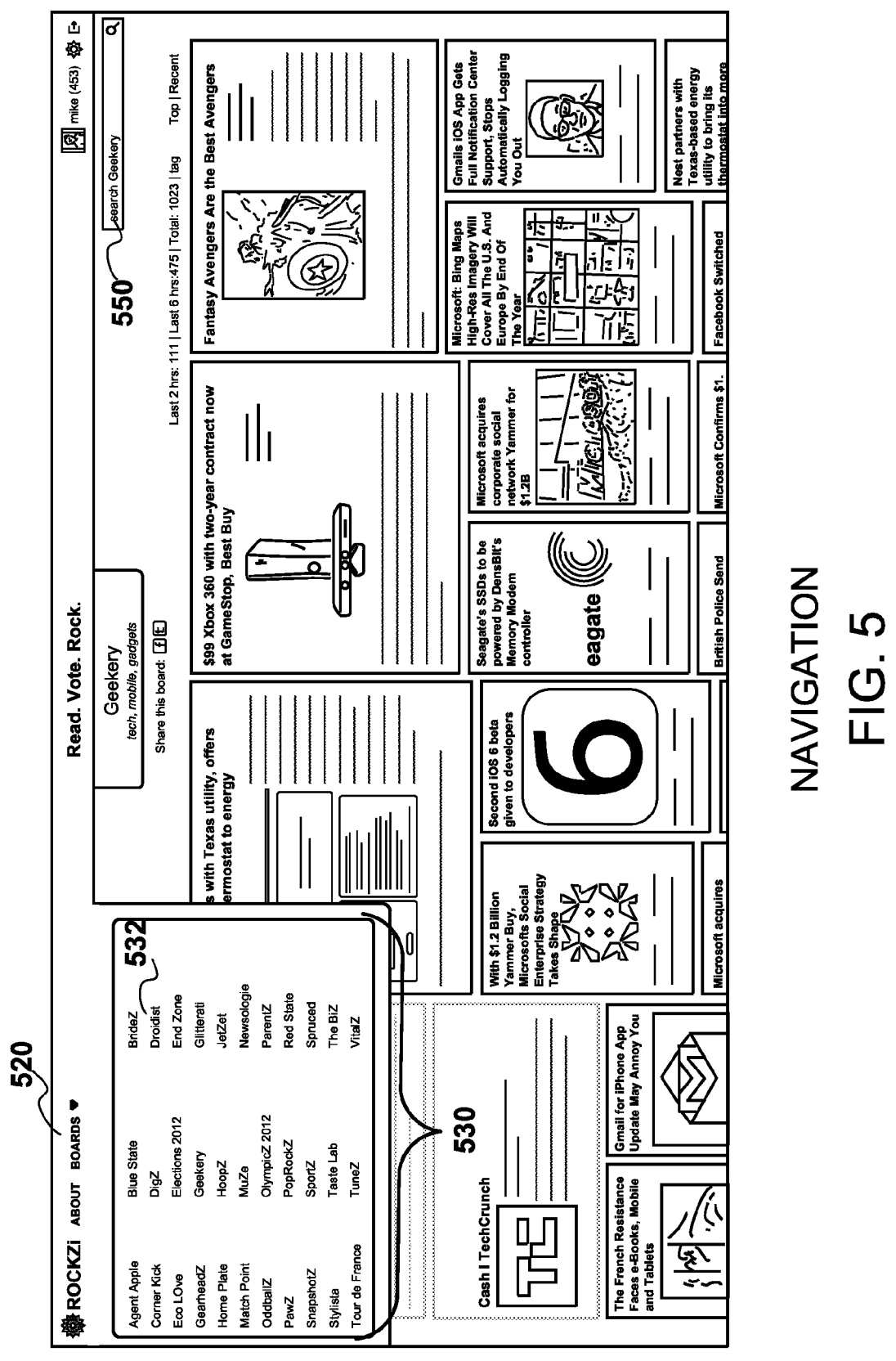

FIG. 5 is a screenshot example of a user's Navigation of the system according to certain embodiments. The Navigation page may allow users to move between and among different News Boards. In the example Navigation screen, the "Boards" drop down menu 520 is displayed. This drop down menu may allow a user to navigate to a different News Board by selecting any of the variously listed boards 530. This list may be populated in any number of ways including popular Boards by votes, or ones this user frequents most often. Alternatively, the "Boards" drop down 520 may be populated by the editors of the page using any kind of criteria such as popularity or featured links. The listing of boards could be through text as shown in the example 532, or could be any number of icons, summaries, photos, etc.

Navigation could be accomplished in a number of other ways, besides the drop down "Boards" menu 520 from a News Board. For example, the Home Page may allow for navigation to any or all of the News Boards by clicking on the link tiles. By clicking on the title 532 of another Board from the drop down menu, the system may cause the selected titled News Board to be displayed to the user.

The Boards drop down is another way to do so. Still another way for a user to navigate the News Boards is through the search box 550 in the top of the News Board as discussed in this disclosure.

The drop down box may be populated by any number of titles, and could even include a scroll feature (not pictured) to allow for many titles to be displayed on any sized window or drop down menu.

User Boards

Figure 6:
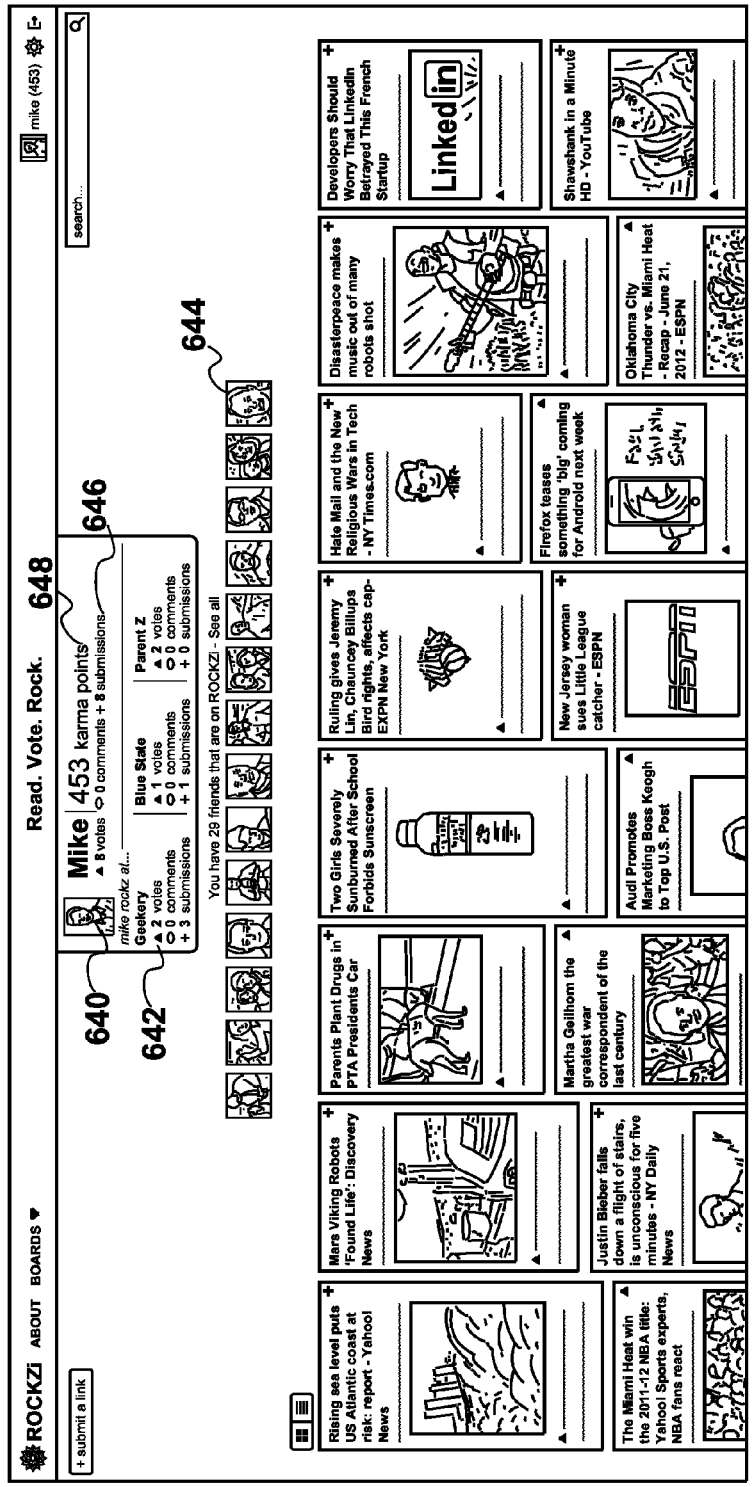
FIG. 6 is a drawing of an example screenshot of an example User Board page consistent with certain aspects related to the innovations herein.

FIG. 6 is a screenshot example of a User Board page according to certain embodiments. A User Board may be similar to a News Board in appearance in that the links or articles are caused to be displayed in a tiled fashion for the user to select. The same or similar Snippets/Summaries and exemplary images can be used and created by the system as described above.

Certain differences between the News Board and the User Board may be that a User Board may be customized by a user for a particular purpose and/or desire. A News Board may display either the "Top" or "Recent" links or articles dealing with a particular topic. The User Board may be populated according to the logged in user preference. Thus, when a user logs in, that user may choose to view his or her own selection of topics. The user may select specific topics, or broad genres of topics to include on his or her Board.

Users may also customize the Snippets and/or images used to display with the appropriate link or article. In this way, users can become editors of not only the content of the overall Board, but of each tiled display as well.

The top of the example User Board here shows the owner or editor of the board, the user who has customized it 640. Here, "Mike" is shown as an icon pulled from a social network used to log in. The icon could come from any number of places such as an upload to this system itself or a social network page or other site. The identification information could be located anywhere on the page, but here it is shown on the top center. Inside the box, besides his name, the identification shows which top three topics the user has chosen for his or her User Board 642. Here, the example shows that "Mike Rockz at . . . " and his top three topics, "Geekery," "Blue State," and "ParentZ" are shown 642. Within those topics, the icons show how many votes, comments and submissions have been added within those topics. These can be for either the particular user, for global information or for a subset of users, such as the user's friends or followers who use the system.

This example identification box also shows, for example, how many votes, comments and submissions this particular user has recently submitted 646.

User Points

Alongside the User name and icon is a listing of "Karma Points," 648. The name of the reward points could be anything, but the example here is "Karma Points" as an example. These points are points that may be awarded by the system to a particular user for various things, as a form of "gamification" of the system. Examples include time spent on the website, for commenting or voting on links or articles, for submitting URLs, for receiving votes or comments on your submissions, for receiving votes or comments on articles or links you have commented on or voted on, adding friends, for editing Boards, for amassing click outs, for creating Boards, for allowing actions to be posted to social networks or any number of other things as motivation to users. When bookmarklets are used to submit, clock outs add points as well.

In certain example embodiments, users can amass Karma Points in order to gain access to special features. Editors of Boards may be required to have a certain number of points. Or the number of User Boards may be tied to thresholds of points. Rewards of other kinds such as direct mails or email promotions may also be used for point thresholds. Goals and special features can further incentivize use.

In certain embodiments, the system can then show leader boards of users with Karma Points. These can be broken down by topic or global or sub group. These leader boards will help incentivize system use. Leaders may be assigned titles such as "ROCKZi Star" or "Top Rock" in order to add clout to their status. An icon may appear next to their identification image or a boarder or icon may be presented on their User Boards to attract attention.

Social Media in User Boards

Another possible example feature shown on the User Board in FIG. 6 is the "Friends" section 644. This indicates, by showing the icons from the logged in social network, such as Facebook here, which of the user's friends are also using this system. The page can also display what a user's friends are doing on the system itself. A user can learn which topics and News Boards his friends are interested in, for example. The system can use this networked information to improve search results, for example. It can be used to invite people to become editors of particular pages, for example. It can be used to show categories that are popular by friend, friend group or sub group, for example. One such example might be: "What Krishna Rockz: . . . " and lists the topics of interest for Krishna. Or, "Ask your friend Nick . . . " to become an editor of a Board.

In some embodiments, celebrities and sponsored Boards can be used to promote particular topics. For instance, a celebrity with a Twitter social media following may browse this system, submit an article or link and comment on another. Those actions would them publish to that Celebrity's Twitter account for all of his or her followers to view.

Some embodiments allow celebrities or sponsors to create and edit their own User Boards. In this way, the celebrity or sponsor may promote particular topics, stories, themes or advertising messages to any user who views that Board.

Through the user's social media networks, the User Board can be automatically populated based on what the user's friends or followers are posting and liking. This can be used for celebrities as well who are followed by many people or topical boards that gather followers simply based on the content.

User Boards may be either public or private. A public Board is one in which any user of the system can view. A private board is one in which only designated logged in users can view. This list of designated users could be, for example, only friends of the user who edits the Board or a subset of those friends, as determined through a social media site such as Facebook. Commercial entities who sponsor a particular User Board may wish to limit the access of a board to only particular users, such as a beer company wishing to keep out users who are less than 21 years of age. In this way, the social media profile of the user may provide that age verification to a private board.

Searching

Figure 7:
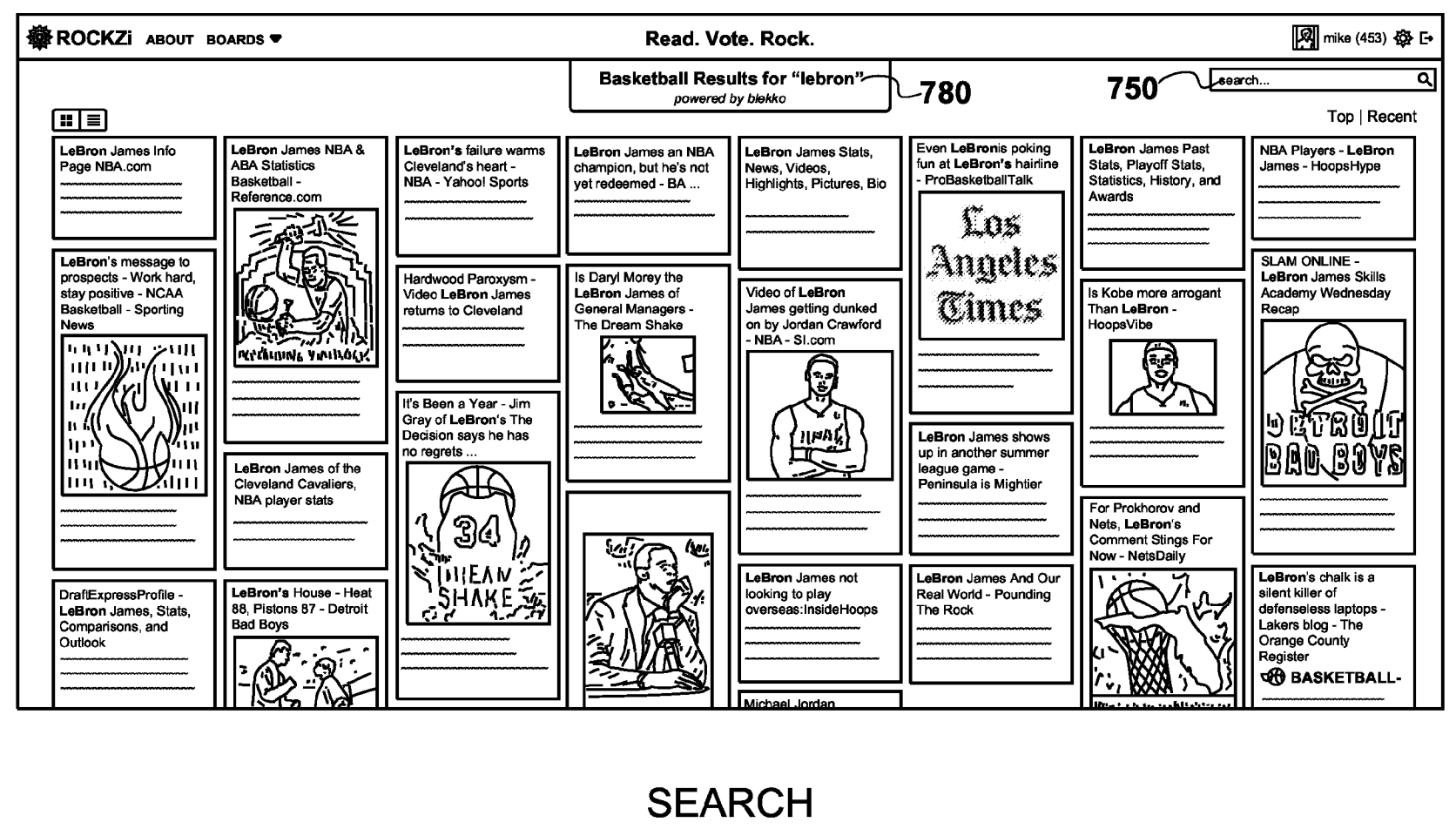

FIG. 7 is a screenshot example of a Search page embodiment. The search feature of this example is accomplished by typing in a search in the search box in the top right of the screen 750. This search could come from any number of search input systems, but here, in this example, a search box with a magnifying glass is used.

The top of the Search page shows the search term 780 or terms used for the search. In the example here, "lebron" was used as a search term, to reference LeBron James, the professional basketball player. Under the search term is the phrase "powered by blekko" in this example embodiment.

When a user types in a search, the system may search the internet for topical articles and web pages. The results are displayed as either lists or tiles as described above. The search results in tile format may show what the other News Boards or User Boards show, for instance, any or all of a Snippet summary, an example image, the address information for the link, and/or the name of the submitting user.

Also, the Home Page could even have a search box as well, although not depicted in the example of FIG. 1.

The system utilized a search engine to search the web for articles or links that involve, mention and/or related to the search term. In this example embodiment, the search engine blekko is used, and mentioned at the top of the page. Any number of search engines could be used for this but here, in this example, blekko is used for its slashtag capabilities.

The system here can help augment the blekko search engine slashtag system by submitting commonly used searches to the editors. Additionally, the information and data gathered from this system could be fed back into the blekko slashtag search engine. In this way, slashtags can be kept updated with news articles and topics that are becoming popular on this system or are linked in this system. The integration of the systems could benefit each other as well. For instance, a slashtag such as "/rockzi" could show all links of this topic that are popular on this system.

Advertising and Monetization

The addition of advertising could be used in any of the pages of this system. In that way, the advertisements can be placed anywhere on the screen. They could be static advertisements or could be dynamic advertisements that animate or move. They could pop up in a new browser window or stay within the browser window of the site.

The advertisements that could be placed on any of the pages of this system could be tailored to the topic of the page or News Board. Thus, tailored or targeted advertisements could reach audiences that are more interested in a particular topic. As an example, an ad for sporting equipment may not receive many click throughs when posted on a generic news website. But that same sporting equipment advertisement may receive many more click throughs if posted on a News Board in this system that has a sports related topic. For example, a baseball bat advertisement on a News Board discussing professional baseball would target fans who already presumably enjoy watching and/or playing baseball.

The advertisements could also be selected based on the web page browsing history of the user, whether logged in or not.

Advertisements may cost more depending on the popularity of a particular News Board. A popular News Board means that it necessarily receives more views, more votes, more comments, and more link or article submissions. The more attention a Board gets, the more ad revenue it can generate.

Internal advertising could be utilized in certain embodiments. For example, related Boards could be established to cross promote one another. For example, the "Red State Board" may advertise the "Blue State Board," or, a baseball Board may promote and advertise for a softball Board to increase readership between and among Boards.

Further, in certain embodiments, promotion of Boards on a search engine could increase visibility and viewership to the system. For example, if a user runs a search on a search engine, such as blekko, and that search returns a certain number of results that have RSS feeds associated with them, advertisements could be placed on the results page for Boards that are associated with the topic of the search. In this way, regular search engine searches could result in targeted advertisements for particular Boards.

In some embodiments, advertising could be placed on search engine results pages if a search on a search engine results in a certain number of RSS feeds which are related to or correspond to a single Board.

Excerpts from U.S. Application 2012/0150844

To further help explain the certain embodiments here, the following paragraphs were copied from U.S. application Ser. No. 13/328,500, U.S. publication 2012/0150844 regarding "slashtags." This will help explain the present embodiments as slashtag search engines maybe used to search for links and articles here. This embodiment is not limited to using such a search engine but is used in the examples disclosed here.

This disclosure relates to a method for requesting a search query to be displayed in a web browser. The method comprises receiving one or more search terms and a slash operator selected from a plurality of slash operators, and generating a search result based on the one or more search terms and the slash operator.

The method further comprises generating the search result comprises providing a search result list that organizes content based on the one or more search terms that are within the category determined by the slash operator. The plurality of slash operators comprises mainstream operators, content operators, facet operators, URL operators, and list operators.

Finally, the method further comprises utilizing pre-intersect common filters when generating the search result.

In some embodiments, another category of operators include list operators.

TABLE 4

Operator Contents

| Name | Data | Type | Example Query |
|---|---|---|---|
| huffpo | http://huffingtonpost.com/ | distance-1 | Barack Obama/huffpo |
| techmeme | http://techmeme.com/ | distance-1 | Barack Obama/techmeme |
| fail | http://failblog.org/ | domain name | Barack Obama/fail |
|  | http://shipmentoffail.com/ | domain name |  |
|  | http://screwups.com/fail | path prefix |  |

These list operators are driven by a list containing types of content including, but not limited to, domain names (google.com), URL path prefixes (espn.com/nfl, which would match both espn.com/nfl/team1 and espn.com/nfll-team2), and individual URLs. In addition, a list operator might include other list operators, or use special query operators, facet operators, or URL operators to add to or subtract from the list operator.

In addition to the above, an element of the list might include both the element on the list, and all webpages which are distance-N away on the graph of web pages. For example, distance-I from techcrunch.org would contain all pages at the website techcrunch.org plus every webpage pointed to by any page at techcrunch.org.

For example, the /huffpo list operator initiates a search of all pages in the index which are at or linked (distance-1) from any webpage at the domain huffingtonpost.com. To illustrate, if a user enters a search query "Barack Obama/huffpo", and a webpage at huffingtonpost.com links a page at the NY Times, that page at the NY Times may be returned as part of the answer.

These user-edited operators exist in multiple types. One type is usable by anyone and editable by anyone. For example, global list operators are editable and useable by everyone. Another type is usable by its creator and only edited by its creator. Other types include operators which can be used by their creator and friends, or edited by the creator and friends. And all combinations of the above. Users editing these list operators might create or delete entire operators, or might add or delete from the lists of domain names, and so on, contained in an operator.

In order for multiple users to have operators with the same name, without colliding, a "namespace" is used to name operators. The name /greg/linux is used to indicate a /linux operator which is specific to the user Greg. This operator is different from the global /linux operator.

Social methods are used to aid discovery of operators for users. For example, if user 1 has used several of user2's operators in the past, the engine is more likely to suggest yet another of user2's operators as a possibly useful operator.

In addition to using operators in a positive fashion (e.g. /linux), operators can also be used in a negative fashion (e.g. !/linux). This deletes all results from the query which match the /linux operator. In another example, "/linux !/blogs" would return all results which matched the /linux operator and did not match the /blogs operator.

In addition to negating whole operators, a list operator might contain a negative entry, which deletes any matching webpage from the results. As an example, if all NY Times opinion information was below http://nytimes.com/opinion, a user might add nytimes.com and the negation of nytimes.com/opinion to her tag /newsonly.

Negative entries in list operators can also be marked to apply only in certain contexts. Consider the list operator /linux, which contain the website /kml.org, which hosts the high-volume Linux Kernel Mailing List (LKML). The query "/linux /date" would then be dominated by LKML postings, drowning out all else. In this case, a user may add a negative entry for /kml.org that only applies when the results are sorted by date, such as when the ldate operator is used. Then "/linuxldate" would contain topical information about Linux without being drowned out by LKML postings.

Slashtags

As an example of the productive use of several of these features together, assume that a user want to add to the /linux list operator. The user may do a search for [linux /!linux], i.e. a page that appears in the results for a search on [/inux] which is not already included in the /linux list operator. The user may then select some URLs which the user believes would look good as a part of /linux, click on the "slashtags" button for each, view the existing tags for each selected URL, and finally add the /linux list operator to the list of operators containing each selected URL.

As an example of list operators changing the meaning of a query, consider the facet operator /news and the list operator /golf, which contain multiple golfing websites. A search for [Tiger Woods /news] likely return a large number of hits for Mr. Woods' personal life, while a search for [Tiger Woods /golf] likely returns many more hits for Tiger Woods' golf career.

In some embodiments, list operators can be collaboratively edited by multiple end-users, perhaps aided by an employee community manager. In some embodiments, social feedback is used to aid the process of selecting edits which are actually applied to the user-specified operator, i.e. editors are enabled to see that User Foo has had 9 of its last 10 edits rejected, or that User Foo tends to vote against the opinions of more trusted editors.

In some embodiments, a professional 'community manager' helps select which edits are allowed, and referees debates among end-users. In some embodiments, a hierarchy of volunteer and professional community mangers performs these functions. Discussion forums are created to discuss edits of each list operator. A history feature allows exploring the history of particular domain names or URL paths.

Pre-Intersect Lists

In some embodiments, pre-intersect common filters (not shown) are utilized by a respective search operation for greater speed or depth. The web index of the search database stores many lists for particular search terms. For example, in a list of webpages containing the word "Greg," each list is ordered according to the relevance of the webpage to the word "Greg." These lists are cut off at a fixed limit, so (e.g.) only the top 10,000 webpages mentioning the word "Greg" are in the list.

When an answer to a query is requested, such as "Greg /blogs" (blog postings mentioning the word Greg), a naive way to compute this would be to look at the list of webpages for the word Greg, and see which ones we have labeled as blog postings. If the blog postings mentioning Greg are rare compared to mentions of Greg, there may be no blog postings about Greg in the Greg list.

To give a better answer in this circumstance, a list for "Greg" is generated containing the top N webpages mentioning "Greg" and also having the property of being "/blog." Many of such lists are generated, one for each /operator to provide a better answer.

Creating new "Boards"

Users and administrators can create new "boards". This creation option may be offered as a button available at all times, and/or after a successful or unsuccessful search for a "board".

Using keywords provided by the user, a list of potential information sources may be presented by the system. These potential information sources include RSS feeds on websites, found by searching in a search engine such as blekko.com, and/or RSS feeds emitted by a search engine such as blekko.com, using search engine features such as date sorting, date ranges, and slashtags. The user may then accept, reject, and/or modify these information sources, and potentially add additional ones.

Figure 8:
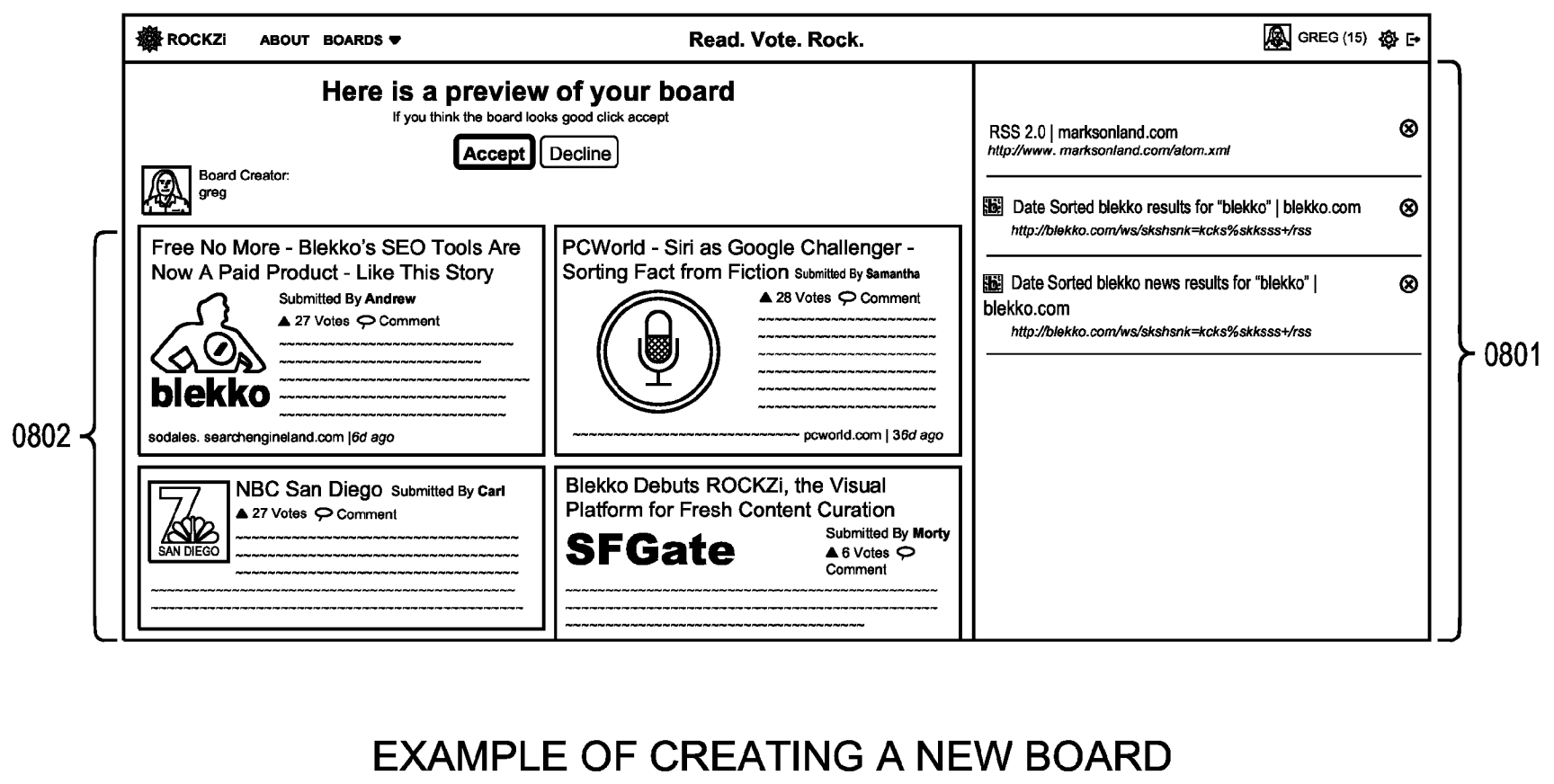

FIG. 8 is one example embodiment of a dialog presented to the user creating the board. On the right 0801 is a list of potential information sources, with an "x" UI element used to delete a source. On the left bottom, 0802 is a preview of the initial contents of the board, given the potential information sources currently being considered by the user.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various embodiments with various modifications as are suited to the particular use contemplated.

It should be noted that the terms "site" and "page" in reference to an Internet website or webpage are interchangeable and mean the same thing.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various embodiments with various modifications as are suited to the particular use contemplated.

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertain that variations and modifications of the various implementations shown and described herein may be made without departing from the spirit and scope of the embodiments here. Accordingly, it is intended that the embodiments be limited only to the extent required by the applicable rules of law.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and their practical applications, to thereby enable others skilled in the art to best utilize the various embodiments with various modifications as are suited to the particular use contemplated.

What is claimed is:

1. A method, comprising:
    at a server in communication with a database and a network, receiving from a user a link to an internet webpage, via the network;
    analyzing, by the server, a Rich Site Summary (RSS) feed of the internet webpage and text in of the internet webpage;
    categorizing, by the server, the internet webpage into a predetermined category based on the RSS feed of the internet webpage and the text in the internet webpage;
    creating, by the server, a summary of the internet webpage, utilizing the RSS feed of the internet webpage and the text in the internet webpage;
    identifying, by the server, an image from the internet webpage;
    resizing, by the server, the image from the internet webpage to create a resized image;
    including, by the server, the resized image in the summary of the internet webpage, upon determining that the resized image has a minimum size, meets predetermined aspect ratio limits, and is not repeated within the predetermined category;
    in a webpage associated with the predetermined category, displaying, by the server, the summary of the internet webpage with summaries of other internet webpages categorized into the predetermined category;
    receiving from the user, at the server via the network, a comment on the displayed internet webpage via the webpage associated with the predetermined category;
    receiving from the user, at the server via the network, a vote for the internet webpage, wherein the vote is included in a rating of the linked webpage;
    displaying, by the server in the webpage associated with the predetermined category, the comment and the vote, in the summary of the internet webpage; and
    displaying, by the server in a home page, a plurality of tiles representative of the webpage associated with the predetermined category as well as webpages associated with additional predetermined categories, where the plurality of tiles are ordered according to the vote for the internet webpage and a plurality of votes for additional internet webpages in the webpage associated with the predetermined category and the webpages associated with the additional predetermined categories.

2. The method of claim 1 wherein the summary of the internet webpage includes a plurality of representative portions of text and a plurality of representative photos, from the linked webpage.

3. The method of claim 1 further comprising, at the server, causing display of a page associated with the user, including:
a summary of each of a predetermined number of categories, where the summary of each of the predetermined number of categories includes an indication of a number of votes, comments, and submissions within each category that are submitted by the predetermined user;
a number of reward points accumulated by the user for performing a plurality of actions including spending time on a predetermined website, commenting and voting on links or articles, submitting one or more links to internet webpages, receiving one or more votes or comments on submitted links to internet webpages, and receiving one or more votes or comments on likes to internet webpages that have been commented on by the user; and
an identification of a plurality of friends of the user that use a predetermined service, where each of the plurality of friends is represented by an icon retrieved from a social network.

4. The method of claim 1 further comprising, at the server, allowing the user to log into the home page; and
awarding a user point to the user, based on at least one of, the user comment, the user vote, user visits to a webpage, votes received for submitted links, comments received for submitted links, category creation, and social media links.

5. The method of claim 1 wherein a manner in which the summary of the internet webpage is displayed in the webpage associated with the predetermined category, as well as a time that the internet webpage is displayed in the webpage associated with the predetermined category, is determined based on a status of the user.

6. The method of claim 1, where the plurality of tiles are further ordered according to a time when each of the plurality of categories was updated.

7. A system for aggregating internet web pages comprising:
a hardware server in communication with a database and a network, the server configured to:
analyze, by the server, a Rich Site Summary (RSS) feed of the internet webpage and text in the internet webpage;
categorize, by the server, the internet webpage into a predetermined category based on the RSS feed of the internet webpage and the text in the internet webpage;
create, by the server, a summary of the internet webpage, utilizing the RSS feed of the internet webpage and the text in the internet webpage;
identify, by the server, an image from the internet webpage;
resize, by the server, the image from the internet webpage to create a resized image;
include, by the server, the resized image in the summary of the internet webpage, upon determining that the resized image has a minimum size, meets predetermined aspect ratio limits, and is not repeated within the predetermined category;
in a webpage associated with the predetermined category, display, by the server, the summary of the internet webpage with summaries of other internet webpages categorized into the predetermined category;
receive from the user, at the server via the network, a comment on the displayed internet webpage via the webpage associated with the predetermined category;
receive from the user, at the server via the network, a vote for the internet webpage, wherein the vote is included in a rating of the linked webpage;
display, by the server in the webpage associated with the predetermined category, the comment and the vote, in the summary of the internet webpage; and
display, by the server in a home page, a plurality of tiles representative of the webpage associated with the predetermined category as well as webpages associated with additional predetermined categories, where the plurality of tiles are ordered according to the vote for the internet webpage and a plurality of votes for additional internet webpages in the webpage associated with the predetermined category and the webpages associated with the additional predetermined categories.

8. The system of claim 7 wherein the summary of the internet webpage includes a plurality of representative portions of text and a plurality of representative photos, from the linked webpage.

9. The system of claim 7 wherein the server is further configured to cause display of a page associated with the user, including:
a summary of each of a predetermined number of categories, where the summary of each of the predetermined number of categories includes an indication of a number of votes, comments, and submissions within each category that are submitted by the predetermined user;
a number of reward points accumulated by the user for performing a plurality of actions including spending time on a predetermined website, commenting and voting on links or articles, submitting one or more links to internet webpages, receiving one or more votes or comments on submitted links to internet webpages, and receiving one or more votes or comments on likes to internet webpages that have been commented on by the user; and
an identification of a plurality of friends of the user that use a predetermined service, where each of the plurality of friends is represented by an icon retrieved from a social network.

10. The system of claim 7 wherein the server is further configured to:
allow the user to log into the home page; and
award a user point to the user, based on at least one of, the user comment, the user vote, user visits to a webpage, votes received for submitted links, comments received for submitted links, category creation, and social media links.

11. The system of claim 7 wherein a manner in which the summary of the internet webpage is displayed in the webpage associated with the predetermined category, as well as a time that the internet webpage is displayed in the webpage associated with the predetermined category, is determined based on a status of the user.

12. The system of claim 7 wherein the server is further configured to, cause display of a search box in the category page; allow the user to send a search query to the search engine via the search box; and cause display of the search results, based on the search query.

13. The system of claim 12 wherein the search query includes slashtags.

14. A non-transitory computer-readable medium having computer-executable instructions thereon for a method of aggregating internet web pages, the method comprising:

at a server in communication with a database and a network, receiving from a user a link to an internet webpage, via the network;

analyzing, by the server, a Rich Site Summary (RSS) feed of the internet webpage and text in the internet webpage;

categorizing, by the server, the internet webpage into a predetermined category based on the RSS feed of the internet webpage and the text in the internet webpage;

creating, by the server, a summary of the internet webpage, utilizing the RSS feed of the internet webpage and the text in the internet webpage;

identifying, by the server, an image from the internet webpage;

resizing, by the server, the image from the internet webpage to create a resized image;

including, by the server, the resized image in the summary of the internet webpage, upon determining that the resized image has a minimum size, meets predetermined aspect ratio limits, and is not repeated within the predetermined category;

in a webpage associated with the predetermined category, displaying, by the server, the summary of the internet webpage with summaries of other internet webpages categorized into the predetermined category;

receiving from the user, at the server via the network, a comment on the displayed internet webpage via the webpage associated with the predetermined category;

receiving from the user, at the server via the network, a vote for the internet webpage, wherein the vote is included in a rating of the linked webpage;

displaying, by the server in the webpage associated with the predetermined category, the comment and the vote, in the summary of the internet webpage; and displaying, by the server in a home page, a plurality of tiles representative of the webpage associated with the predetermined category as well as webpages associated with additional predetermined categories, where the plurality of tiles are ordered according to the vote for the internet webpage and a plurality of votes for additional internet webpages in the webpage associated with the predetermined category and the webpages associated with the additional predetermined categories.

15. The non-transitory computer-readable medium having computer-executable instructions thereon for a method of aggregating internet web pages of claim 14 wherein the summary of the internet webpage includes a plurality of representative portions of text and a plurality of representative photos, from the linked webpage.

16. The non-transitory computer-readable medium having computer-executable instructions thereon for a method of aggregating internet web pages of claim 14 further comprising, at the server, causing display of a page associated with the user, including:
- a summary of each of a predetermined number of categories, where the summary of each of the predetermined number of categories includes an indication of a number of votes, comments, and submissions within each category that are submitted by the predetermined user;
- a number of reward points accumulated by the user for performing a plurality of actions including spending time on a predetermined website, commenting and voting on links or articles, submitting one or more links to internet webpages, receiving one or more votes or comments on submitted links to internet webpages, and receiving one or more votes or comments on likes to internet webpages that have been commented on by the user; and
- an identification of a plurality of friends of the user that use a predetermined service, where each of the plurality of friends is represented by an icon retrieved from a social network.

* * * * *